(12) United States Patent
Viswanathan

(10) Patent No.: US 11,720,992 B2
(45) Date of Patent: Aug. 8, 2023

(54) METHOD, APPARATUS, AND COMPUTER PROGRAM PRODUCT FOR GENERATING AN OVERHEAD VIEW OF AN ENVIRONMENT FROM A PERSPECTIVE IMAGE

(71) Applicant: HERE GLOBAL B.V., Eindhoven (NL)

(72) Inventor: Anirudh Viswanathan, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 98 days.

(21) Appl. No.: 17/302,114

(22) Filed: Apr. 23, 2021

(65) Prior Publication Data

US 2021/0241420 A1 Aug. 5, 2021

Related U.S. Application Data

(63) Continuation of application No. 16/229,371, filed on Dec. 21, 2018, now Pat. No. 11,017,499.

(51) Int. Cl.
*G06T 1/20* (2006.01)
*G06T 7/00* (2017.01)
(Continued)

(52) U.S. Cl.
CPC ............ *G06T 1/20* (2013.01); *G01C 21/3667* (2013.01); *G01C 21/3841* (2020.08);
(Continued)

(58) Field of Classification Search
CPC ............... G06T 3/0093; G06T 7/97; G06T 2207/10032; G06T 2207/20084;
(Continued)

(56) References Cited

U.S. PATENT DOCUMENTS 6,671,400 B1 12/2003 Ekpar et al.
9,081,385 B1 7/2015 Ferguson et al.
(Continued)

FOREIGN PATENT DOCUMENTS

CN 105764030 A 7/2016
CN 106530227 A 3/2017
(Continued)

OTHER PUBLICATIONS

Extended European Search Report for European Application No. 21194518.3 dated Dec. 23, 2021, 10 pages.
(Continued)

*Primary Examiner* — Kenny A Cese
(74) *Attorney, Agent, or Firm* — Alston & Bird LLP

(57) ABSTRACT

A method, apparatus and computer program product are provided for warping a perspective image into the ground plane using a homography transformation to estimate a bird's eye view in real time. Methods may include: receiving first sensor data from a first vehicle traveling along a road segment in an environment, where the first sensor data includes perspective image data of the environment, and where the first sensor data includes a location and a heading; retrieving a satellite image associated with the location and heading; applying a deep neural network to regress a bird's eye view image from the perspective image data; applying a Generative Adversarial Network (GAN) to the regressed bird's eye view image using the satellite image as a target of the GAN to obtain a stabilized bird's eye view image; and deriving values of a homography matrix between the sensor data and the established bird's eye view image.

20 Claims, 4 Drawing Sheets

(51) Int. Cl.
  *G01C 21/36* (2006.01)
  *G06T 3/00* (2006.01)
  *G01C 21/00* (2006.01)
(52) U.S. Cl.
  CPC ........ *G01C 21/3852* (2020.08); *G06T 3/0093* (2013.01); *G06T 7/97* (2017.01); *G06T 2207/10032* (2013.01); *G06T 2207/20084* (2013.01); *G06T 2207/20212* (2013.01); *G06T 2207/30252* (2013.01)
(58) Field of Classification Search
  CPC . G06T 2207/20212; G06T 2207/30252; G06T 1/20; G01C 21/3667; G01C 21/3841; G01C 21/3852
  See application file for complete search history.

(56) References Cited

U.S. PATENT DOCUMENTS

| | | | |
|---|---|---|---|
| 9,098,747 B1* | 8/2015 | Stewart | G06V 20/182 |
| 10,282,915 B1* | 5/2019 | Lin | G06T 17/00 |
| 2009/0326811 A1 | 12/2009 | Luoma et al. | |
| 2011/0115902 A1 | 5/2011 | Jiang et al. | |
| 2012/0306913 A1 | 12/2012 | Fialho et al. | |
| 2014/0064624 A1* | 3/2014 | Kim | G06T 7/80 382/201 |
| 2014/0267688 A1* | 9/2014 | Aich | B60W 30/00 348/113 |
| 2017/0004233 A1 | 1/2017 | Han et al. | |
| 2017/0328716 A1 | 11/2017 | Ma | |
| 2017/0369057 A1 | 12/2017 | Gurghian et al. | |
| 2019/0251401 A1 | 8/2019 | Shechtman | |
| 2019/0378414 A1* | 12/2019 | Pari | G08G 1/04 |
| 2020/0097491 A1* | 3/2020 | Berthiaume | G06N 20/00 |

FOREIGN PATENT DOCUMENTS

| | | |
|---|---|---|
| CN | 107003603 A | 8/2017 |
| CN | 107545232 A | 1/2018 |
| CN | 108388641 A | 8/2018 |
| CN | 108460739 A | 8/2018 |
| CN | 108537742 A | 9/2018 |
| CN | 108876707 A | 11/2018 |
| CN | 109035142 A | 12/2018 |
| WO | WO 2018/148574 A1 | 8/2018 |

OTHER PUBLICATIONS

Extended European Search Report for Application No. 19217656.8 dated Feb. 25, 2020, 7 pages.
Kastrinaki, V. et al., A Survey of Video Processing Techniques for Traffic Applications, Image and Vision Computing 21 (2003) 359-381.
Laganiere, R., Compositing a Bird's Eye View Mosaic, Pro. Conf. Vision Interface (May 2000) 382-387, 6 pages.
Lefevre, S. et al., Towards Seamless Multi-View Scene Analysis From Satellite to Street-Level [online] [retrieved Feb. 7, 2019], Retrieved via the Internet: <URL: https://arxiv.org/pdf/1705.0810.pdf>. (dated May 23, 2017) 32 pages.
Liu, M. et al., Geometry-Aware Deep Network for Single-Image Novel View Synthesis, 2018 IEEE/CVF Conference on Computer Vision and Pattern Recognition (2018) 4616-4624.
Notice of Allowance for U.S. Appl. No. 16/229,371 dated Jan. 27, 2021.
Regmi, K. et al., Cross-View Image Synthesis Using Conditional GANs [online] [retrieved Feb. 7, 2019], Retrieved via the Internet: <URL: https://arxiv.org/pdf/1803.03396.pdf>. (dated Mar. 29, 2018) 10 pages.
Sengupta, S. et al., Automatic Dense Visual Semantic Mapping From Street-Level Imagery [online] [retrieved Feb. 7, 2019], Retrieved via the Internet: <URL: https://www.inf.ethz.ch/personal/ladicky1/map_iros12.pdf>. (dated Oct. 2012) 6 pages.
Zhai, M. et al., Predicting Ground-Level Scene Layout From Aerial Imagery [online] [retrieved Feb. 7, 2019], Retrieved via the Internet: <URL: https://arxiv.org/pdf/1612.02709.pdf>. (dated Dec. 8, 2016) 13 pages.
Office Action for Chinese Application No. 201911322743.X dated Dec. 22, 2022, 8 pages.

\* cited by examiner

METHOD, APPARATUS, AND COMPUTER PROGRAM PRODUCT FOR GENERATING AN OVERHEAD VIEW OF AN ENVIRONMENT FROM A PERSPECTIVE IMAGE

CROSS-REFERENCE TO RELATED APPLICATIONS

This application is a continuation of and claims priority to U.S. patent application Ser. No. 16/229,371, filed on Dec. 21, 2018, the contents of which are hereby incorporated by reference in their entirety.

TECHNOLOGICAL FIELD

An example embodiment relates generally to generating a bird's eye view of an environment of a vehicle, and more particularly, to warping a perspective image into the ground plane using a homography transformation to estimate a bird's eye view in real time.

BACKGROUND

Modern day vehicles utilize a plurality of sensors, for example cameras, LiDAR, and radar, to accomplish various safety and navigation tasks. For example, some autonomous vehicles use at least LiDAR, cameras, and various other sensors to ensure navigation and control of the vehicle occurs properly and safely. Sensors are used to capture representations of the environment including environment features ("features"). Autonomous vehicles may detect and/ or interpret features to perform vehicle localization. For example, an autonomous vehicle may detect a lane line to determine the vehicle's position corresponding to a previously generated and/or stored archival environment map.

Vehicles may capture images using sensors attached to the vehicle which provides a perspective view of the environment from the perspective of the vehicle. Perspective views are adequate and even desirable for certain navigational functions; however, perspective views are generally limited in that distal objects are unclear and a moving vehicle may eclipse the most detailed, near-vehicle portion of a view relatively quickly as the vehicle travels along a roadway. Navigation has historically been performed using maps that provide an overhead or "bird's eye" view of a region which may include a network of roadways. The bird's eye view of the network of roadways provides a more intuitive view of a path of a vehicle and may be more desirable than a perspective view when following a route or navigating a network of roads.

BRIEF SUMMARY

A method, apparatus and computer program product are provided in accordance with an example embodiment in order for establishing a bird's eye view of an environment of a vehicle, and more particularly, to warping a perspective image into the ground plane using a homography transformation to estimate a bird's eye view in real time. Embodiments described herein may provide an apparatus including at least one processor and at least one non-transitory memory including program code instructions. The computer program code instructions may be configured to, when executed, cause the apparatus to: receive first sensor data from a first vehicle traveling along a road segment in an environment, where the first sensor data includes perspective image data of the environment and where the first sensor data includes a location and a heading; retrieve a satellite image associated with the location and heading; apply a deep neural network to regress a bird's eye view image from the perspective image data; apply a Generative Adversarial Network (GAN) to the regressed bird's eye view image using the satellite image as a target of the GAN to obtain a stabilized bird's eye view image; derive values of a homography matrix between the sensor data and the stabilized bird's eye view image; and store the derived values of the homography matrix.

The apparatus of an example embodiment may be caused to: receive second sensor data from a second vehicle traveling along a road segment in an environment, where the sensor data includes perspective image data of the environment from a perspective of the second vehicle; apply a homography matrix including the stored, derived values to the sensor data in substantially real time to warp the perspective image data into a ground plane along which the vehicle is traveling; generate a bird's eye view of the environment of the vehicle from the perspective image data; and provide for presentation of the bird's eye view of the environment on a display. The apparatus may be caused to augment satellite image data of the environment with the bird's eye view of the environment. The bird's eye view of the environment may include dynamic objects not found in a satellite image of the environment. Causing the apparatus to retrieve a satellite image associated with the location and heading may include causing the apparatus to identify the location in a satellite image map database and to identify a portion of the satellite image corresponding to the heading. The apparatus may further be caused to receive second sensor data including a perspective image of an environment and to warp the perspective image with the homography matrix including the derived values to obtain a bird's eye view. The apparatus may be caused to repair a satellite image using the obtained bird's eye view image.

Embodiments provided herein may include a computer program product including at least one non-transitory computer-readable storage medium having computer-executable program code portions stored therein. The computer-executable program code portions including program code instructions configured to: receive first sensor data from a first vehicle traveling along a road segment in an environment, where the first sensor data includes perspective image data of the environment and where the first sensor data includes a location and a heading; retrieve a satellite image associated with the location and the heading; apply a deep neural network to regress a bird's eye view image from the perspective image data; apply a Generative Adversarial Network (GAN) to the regressed bird's eye view image using the satellite image as a target of the GAN to obtain a stabilized bird's eye view image; derive values of a homography matrix between the sensor data and the stabilized bird's eye view image; and store the derived values of the homography matrix.

The computer program product of some embodiments may include program code instructions to: receive second sensor data from a second vehicle traveling along a road segment in an environment, where the sensor data includes perspective image data of the environment from a perspective of the second vehicle; apply a homography matrix including the stored, derived values to the sensor data in substantially real time to warp the perspective image data into a ground plane along which the vehicle is traveling; generate a bird's eye view of the environment of the vehicle from the perspective image data; and provide for presentation of the bird's eye view of the environment on a display. Embodiments may include program code instructions to augment satellite image data of the environment with the bird's eye view of the environment. The bird's eye view of the environment may include dynamic objects not found in a satellite image of the environment. The program code instructions to retrieve a satellite image associated with the location and heading may include program code instructions to identify the location in a satellite image map database and to identify a portion of the satellite image corresponding to the heading. Embodiments may include program code instructions to receive second sensor data including a perspective image of an environment and to warp the perspective image with the homography matrix including the derived values to obtain a bird's eye view image. Embodiments may include program code instructions to repair a satellite image using the obtained bird's eye view image.

Embodiments may provide a method including: receiving first sensor data from a first vehicle traveling along a road segment in an environment, where the first sensor data includes perspective image data of the environment, and where the first sensor data includes a location and a heading; retrieving a satellite image associated with the location and heading; applying a deep neural network to regress a bird's eye view image from the perspective image data; applying a Generative Adversarial Network (GAN) to the regressed bird's eye view image using the satellite image as a target of the GAN to obtain a stabilized bird's eye view image; deriving values of a homography matrix between the sensor data and the established bird's eye view image; and storing the derived values of the homography matrix. Embodiments may optionally include: receiving second sensor data from a second vehicle traveling along a road segment in an environment, where the sensor data includes perspective image data of the environment from a perspective of the second vehicle; applying a homography matrix including the stored, derived values to the sensor data in substantially real time to warp the perspective image data into a ground plane along which the vehicle is traveling; generating a bird's eye view of the environment of the vehicle from the perspective image data; and providing for presentation of the bird's eye view of the environment on a display.

Methods may include augmenting satellite image data of the environment with the bird's eye view of the environment. The bird's eye view of the environment may include dynamic objects not found in a satellite image of the environment. Retrieving a satellite image associated with the location and heading may include identifying the location in a satellite image map database and identifying a portion of the satellite image corresponding to the heading. Methods may include receiving second sensor data including a perspective image of an environment and warping the perspective image with the homography matrix including the derived values to obtain a bird's eye view image.

Embodiments may provide an apparatus including: means for receiving first sensor data from a first vehicle traveling along a road segment in an environment, where the first sensor data includes perspective image data of the environment, and where the first sensor data includes a location and a heading; means for retrieving a satellite image associated with the location and heading; means for applying a deep neural network to regress a bird's eye view image from the perspective image data; means for applying a Generative Adversarial Network (GAN) to the regressed bird's eye view image using the satellite image as a target of the GAN to obtain a stabilized bird's eye view image; means for deriving values of a homography matrix between the sensor data and the established bird's eye view image; and means for storing the derived values of the homography matrix. Embodiments may optionally include: means for receiving second sensor data from a second vehicle traveling along a road segment in an environment, where the sensor data includes perspective image data of the environment from a perspective of the second vehicle; means for applying a homography matrix including the stored, derived values to the sensor data in substantially real time to warp the perspective image data into a ground plane along which the vehicle is traveling; generating a bird's eye view of the environment of the vehicle from the perspective image data; and means for providing for presentation of the bird's eye view of the environment on a display.

An example apparatus may include means for augmenting satellite image data of the environment with the bird's eye view of the environment. The bird's eye view of the environment may include dynamic objects not found in a satellite image of the environment. The means for retrieving a satellite image associated with the location and heading may include means for identifying the location in a satellite image map database and identifying a portion of the satellite image corresponding to the heading. The apparatus may include means for receiving second sensor data including a perspective image of an environment and means for warping the perspective image with the homography matrix including the derived values to obtain a bird's eye view image.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
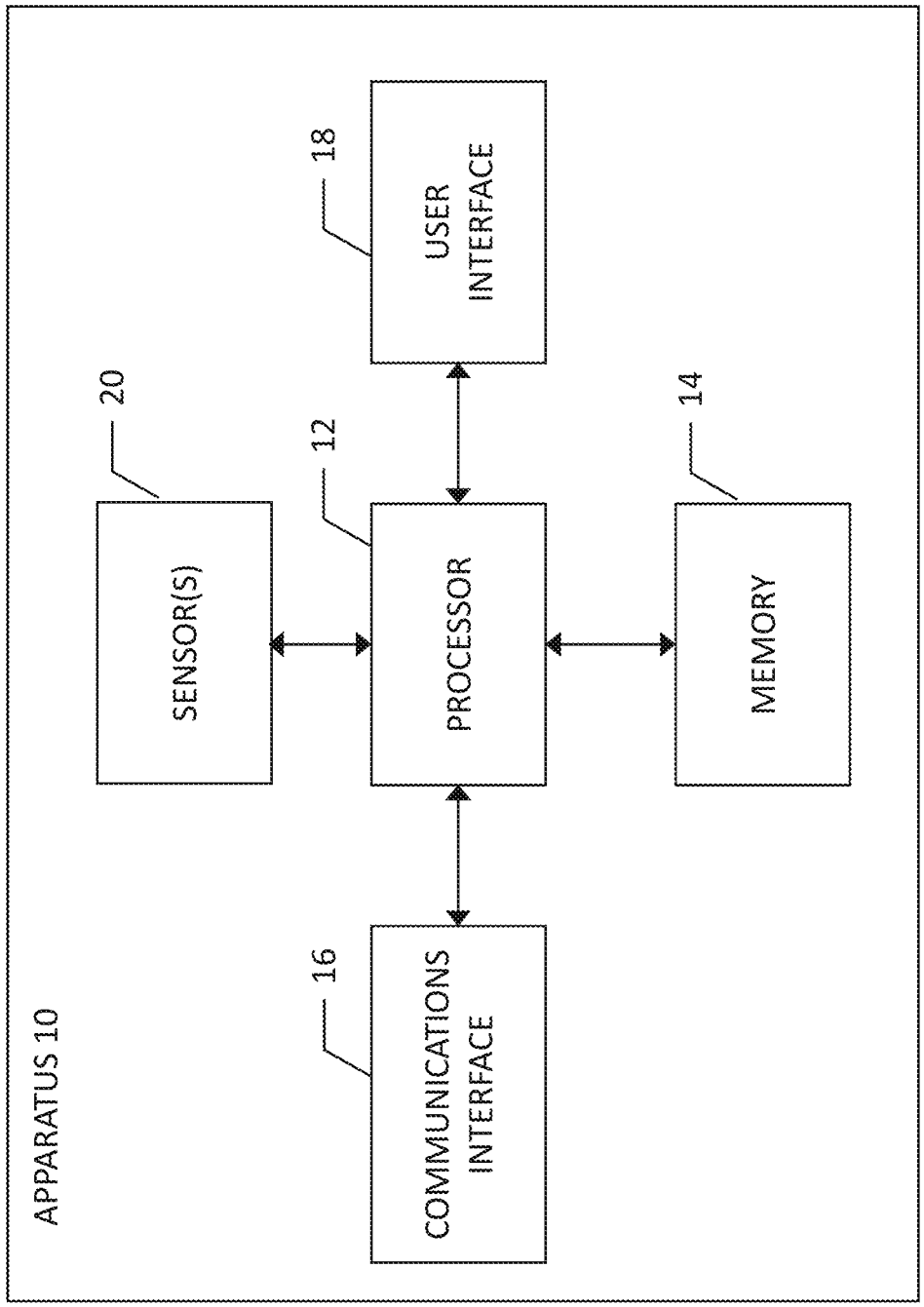
Figure 2:
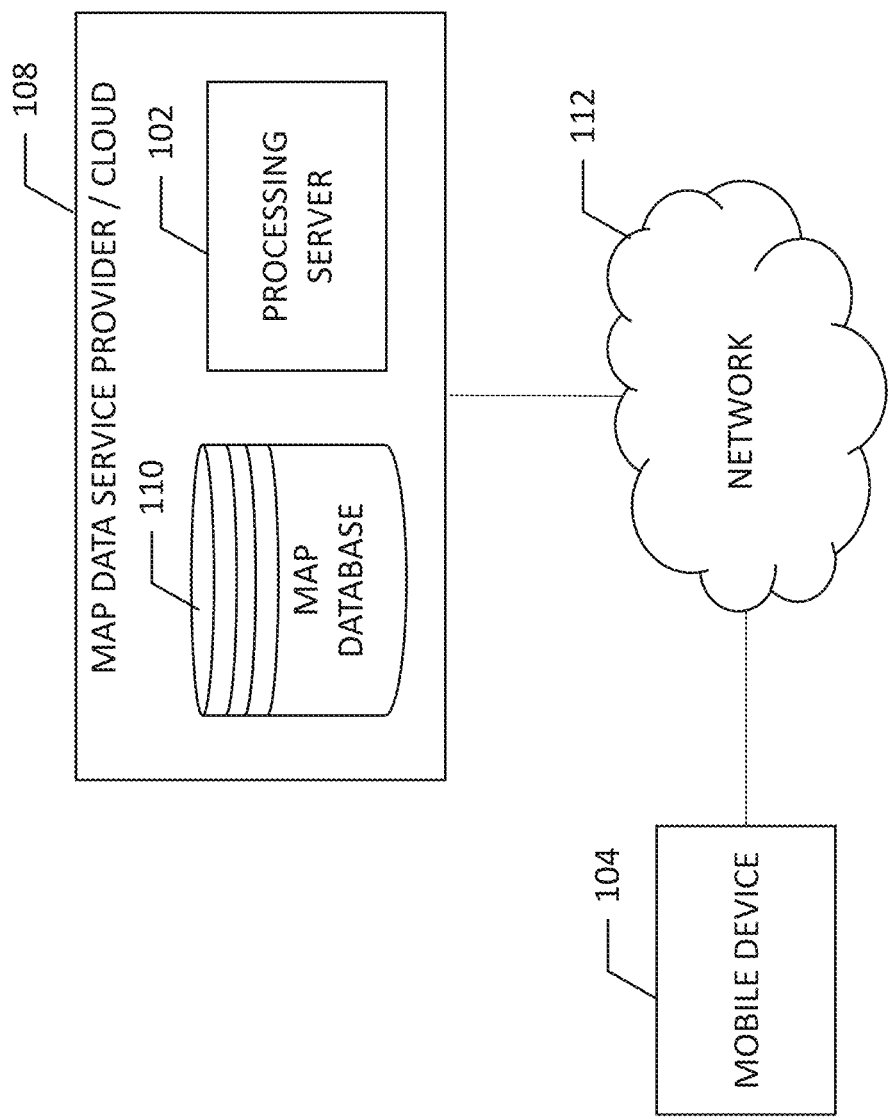
Figure 3:
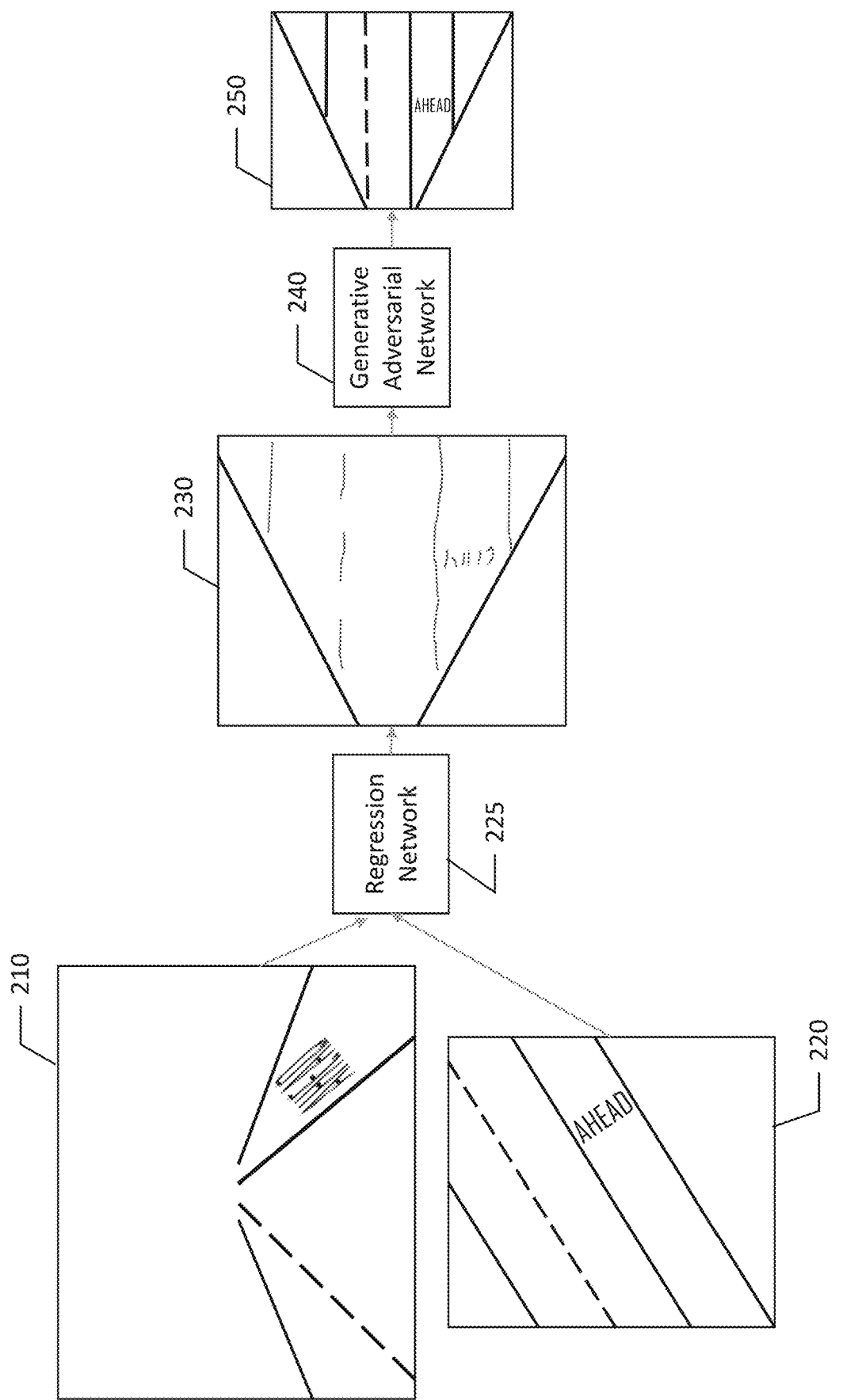
Figure 4:
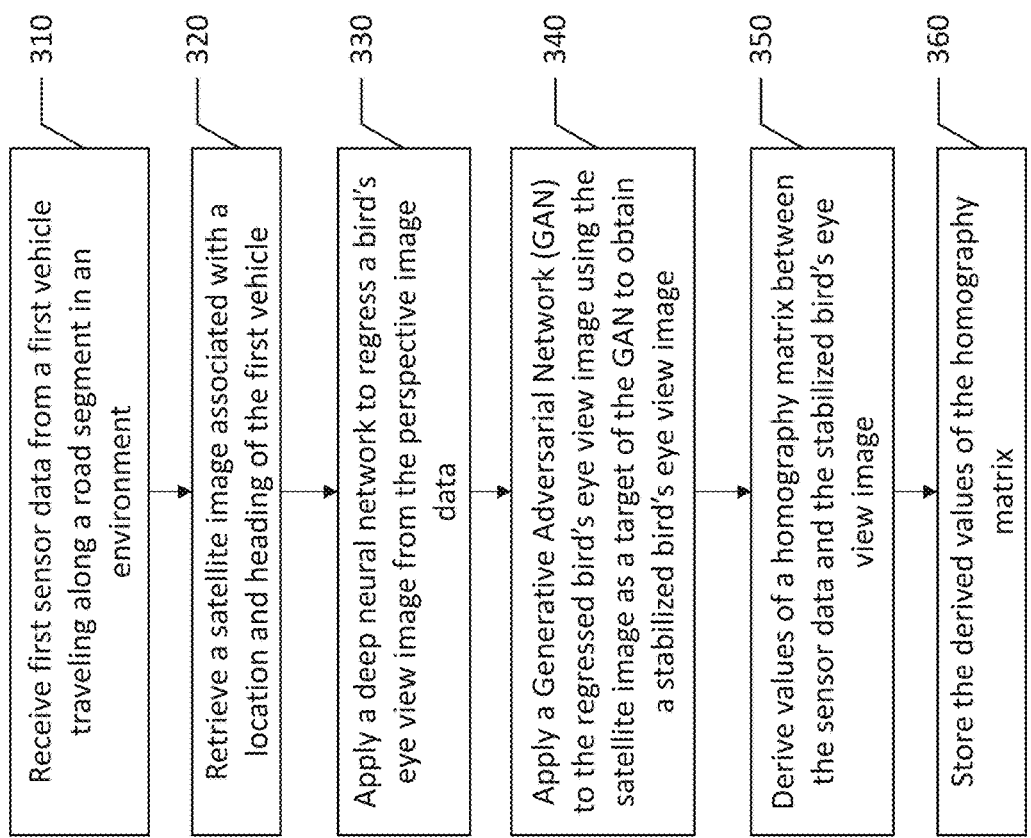

Having thus described certain example embodiments of the present disclosure in general terms, reference will hereinafter be made to the accompanying drawings, which are not necessarily drawn to scale, and wherein:

FIG. 1 is a block diagram of an apparatus according to an example embodiment of the present disclosure;

FIG. 2 is a block diagram of a system for generating a bird's eye view of an environment of a vehicle according to an example embodiment of the present disclosure;

FIG. 3 is a diagram depicting a method of generating a bird's eye view of an environment of a vehicle according to an example embodiment of the present disclosure; and FIG. 4 is a flowchart illustrating the operations performed, such as by the apparatus of FIG. 1, in order to generate a bird's eye view of an environment of a vehicle.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to generate a "bird's eye" or overhead view of an environment of a vehicle, and more particularly, to warping a perspective image into the ground plane using a homography transformation to estimate a bird's eye view in real time. Embodiments described herein relate to the use cases of navigational assistance for manually driven vehicles, autonomous and semi-autonomous driving, and high definition (HD) map construction/updating.

Vehicles equipped with sensors may drive along a road segment and produce probe data indicative of the road segment and properties thereof. Depending upon the capabilities of the sensors of the vehicle, data may include a path of the roadway, a travel speed along the roadway, imagery identifying lane lines or signage along the roadway such as speed limits, stop signs, etc., distance sensors such as Light Imaging, Detection and Ranging (LIDAR) may provide locations and sizes of objects along a roadway, etc. Vehicles traveling along a road segment may perceive their environment using sensors, such as an image sensor. The image sensor is generally mounted to the vehicle in a configuration that faces in the direction of travel as this provides a view of upcoming objects and terrain. The sensor may also be configured to maximize the field of view to capture as much information as possible in the direction of travel.

While a forward-facing sensor configuration is useful for detecting objects of interest in the scene, such as lane lines, signs, dynamic objects (e.g., other vehicles, pedestrians, etc.), the view is somewhat limited, particularly as the distance from the sensor increases and objects in the image become smaller. Further, the perspective view mimics that which an occupant of the vehicle can see. Embodiments described herein perform a specialized transformation of the perspective view image data into the ground plane to create a bird's eye view of the environment in the direction of travel of the vehicle. The bird's eye view may be used in the mapping context, since each pixel of the converted image corresponds to a metric representation, while stitching together such views may create a metric map of the environment. Embodiments described herein automatically generate the bird's eye view from large volumes of data. The generation of a bird's eye view in substantially real time can provide an occupant of a vehicle an alternative perspective for understanding their location relative to an environment of the vehicle. The bird's eye view provides a view that is similar to an overhead map such that a user may better identify a route to aid in navigation or understanding of a location within an environment.

Embodiments described herein may use an apparatus to collect image sensor data in the perspective view from a vehicle traveling along a road segment and perform a specialized transformation to convert the perspective data into a bird's eye view of the environment. The apparatus of an example embodiment may be embodied by a variety of computing devices including, for example, a navigation system, an advanced driver assistance system (ADAS), or the like. Additionally or alternatively, the apparatus may be embodied in other types of computing devices, particularly when the data transformation of sensor data from one or more vehicles is performed by a map services provider, which may be embodied by a server, a computer workstation, a plurality of networked computing devices or the like, that are configured to communicate with or function as the map services provider as described herein. In this regard, FIG. 1 depicts the apparatus 10 of an example embodiment that may be embodied by various computing devices including those identified above. As shown, the apparatus of an example embodiment may include, may be associated with or may otherwise be in communication with a processor 12 and a memory device 14 and optionally a communication interface 16 and/or a user interface 18.

In some embodiments, the processor 12 (and/or co-processors or any other processing circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment also optionally includes a communication interface 16 that may be any means such as a device or circuitry embodied in either hardware or a combination of hardware and software that is configured to receive and/or transmit data from/to other electronic devices in communication with the apparatus, such as by being configured to receive probe data from a sensor or plurality of sensors, and provide said probe data to a database, cloud storage or other external memory device associated with the map services provider. The communication interface may be configured to receive data, such as from a map services provider including a representation of the road geometry to an in-vehicle global positioning system (GPS), in-vehicle navigation system, a personal navigation device (PND), a portable navigation device or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 1, the apparatus 10 may also optionally include or otherwise be in communication with a user interface 18. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms. The user interface 18 may include, for example, a display to provide navigational assistance or route guidance to a user based on data received from the map services provider. The processor and/or user interface circuitry comprising the processor may be configured to control one or more functions of one or more input/output mechanisms through computer program instructions (for example, software and/or firmware) stored on a memory accessible to the processor (for example, memory device 14 and/or the like).

The apparatus 10 may support a mapping or navigation application so as to present maps, which may include the bird's eye representation of image data described herein, or otherwise provide navigation or driver assistance. In order to support a mapping application, the computing device may include or otherwise be in communication with a geographic database, such as may be stored in memory 14. For example, the geographic database includes node data records, road segment or link data records, point of interest (POI) data records, and other data records. More, fewer or different data records can be provided. In one embodiment, the other data records include cartographic data records, routing data, and maneuver data. In order to fully utilize map data within the map database, accurate map-matching of probe data points to locations on the map, such as road segments or links, is necessary.

The apparatus 10 of example embodiments may include one or more sensors 20 as shown in FIG. 1, which may include inertial measurement sensors, global positioning sensors, image sensors, LiDAR (light distancing and ranging) or radar sensors, or the like. Sensors 20 may be used to facilitate autonomous or semi-autonomous vehicle control, and may provide sensed data representing the environment of a vehicle. The sensed data may include a point cloud of distances to objects to build a three-dimensional model of the environment. The sensed data may include image data, such as perspective views of an environment of the vehicle as sensed from the vehicle's location. The collected sensor data from sensor 20 may be vast and may provide information relating to an environment of the vehicle and relating to any condition of the vehicle, such as in the case of sensors that detect vehicle movement, vehicle control parameters (e.g., traction control sensors, antilock braking sensor, etc.). Sensed data may be stored locally on memory 14 or provided via communications interface 16 for processing outside of the apparatus 10.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle through map-matching techniques described herein. Semi-autonomous vehicle control may be any level of driver assistance from adaptive cruise control, to lane-keep assist, or the like.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 10 of FIG. 1, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a physical storage format (PSF)) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can include the apparatus 20 of FIG. 1 and can be embodied by an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

As vehicles become more technologically advanced and include sensor arrays that produce copious amounts of data, opportunities exist to capitalize on the available data and generate from the available data information that is of greater benefit to a user than the raw data gathered. As described above, vehicles may collect image data from the perspective of the vehicle in a direction of travel of the vehicle. This data may be informative and may be used for feature detection and navigational assistance, such as with autonomous or semi-autonomous vehicle control; however, the perspective image view may be limited and may not provide sufficient visual information for some aspects of vehicle control and navigation. A bird's eye view of the environment may provide additional information to facilitate navigational control and/or autonomous or semi-autonomous vehicle control.

The transformation between the perspective image from the vehicle sensor to the bird's eye view may be implemented using a pre-determined homography matrix. The homography matrix is a 3×3 matrix that transforms one plane (the perspective image) into another plane (the bird's eye view image). The estimation of the homography matrix for the purpose of warping the image is challenging and the homography matrix values are sensitive in that small changes in the values lead to large changes in the warped image, leading to distortions if done improperly. Embodiments described herein provide a fully automated technique to generate the homography matrix from data.

The estimation of the homography matrix is most straightforward when computed manually for a specific sensor configuration. A known geometry on the ground, such as a square of predetermined dimension, is recorded in the perspective image. The four corners of the square in the ground plane and in the image represent the transformation, and the homography matrix can be estimated. However, this method is manually intensive and sensor configuration specific, such that it is both computationally expensive and cannot readily be scaled across different sensor configurations. An alternative implementation involves deriving the transformation between the vehicle pose to the local ground-frame from a sensor directly, such as an inertial navigation sensor (INS). However, noisy INS reading renders the estimation process jittery as the vehicle traverses the environment. In both cases, the sensor configuration of the image sensor capturing the perspective image must be known or estimated using the INS for an on-line estimation.

Embodiments described herein provide a real-time method to estimate the bird's eye view transformation of perspective data without regard for the sensor configuration. This may improve the functionality of a computer itself through avoiding the requirement of manual computation of a homography matrix specific to an individual sensor configuration. A neural network may be used to regress the values of the homography matrix that may then be applied to warp the perspective image into the ground plane. Embodiments are agnostic to sensor configuration such that no manual calibration is required, and may be extensible to include data from an INS if and when available.

In order to train a machine learning system of example embodiments, training data must first be collected. Embodiments leverage image capture platforms that are specifically configured to capture image data along road segments of a road network. Such platforms may be employed, for example, by map data service provider 108 to produce "true imagery" which is imagery that is of a known quality and accuracy. The true imagery gathered includes accurate location identification in addition to known sensor quality and sensor positioning/perspective. This enables the collected true data to serve as a valuable reference point of data that is of a known and trusted accuracy. In addition to true imagery, satellite imagery for a region may be used for training deep neural networks of example embodiments described herein.

Using the true imagery that includes perspective image data of an environment and corresponding satellite imagery at the same location, embodiments described herein train a deep neural network. The satellite imagery is the ideal ground projection or "bird's eye view" as it is captured from an aerial perspective and is not generated through transformation. The satellite image is necessarily independent from sensor configuration of a vehicle traveling among a road network. Using captured true imagery, a deep neural network is used to regress the ground projected/bird's eye view image from the perspective image of the captured imagery from the vehicle. This regression may be an approximation of the bird's eye view, but may not be ideal. As such, to refine the regressed image, a Generative Adversarial Network (GAN) may be used to stabilize the regressed image. The regressed image is used as an input to the GAN, while the satellite image is the target. The GAN learns to implicitly derive relevant features in the input image into the ground plane. The satellite image used as the target may be identified based on a location of the sensor that captured the perspective image, along with a heading related to the direction in which the perspective image was captured. This enables the satellite image corresponding to the perspective image to be identified and correlated to the regressed image.

Beyond the true imagery generated perspective images, other image sensor data may be used for training purposes. Using the trained GAN, virtually any outdoor image may be used for training and refinement of the deep neural network with the corresponding location of the satellite image to augment the dataset as described above. Once the network is trained, a bird's eye view may be automatically generated from a perspective image for any sensor configuration, and can be applied in the real-time in-vehicle map generation process. This may enable presentation of a top-down map view of a region including objects and features captured in a perspective image from sensor data of the vehicle to be included in the bird's eye view of the area in which the vehicle is traveling.

FIG. 3 illustrates an example embodiment of the present disclosure for training the deep neural network. As shown, a perspective image 210 is captured by sensors, such as sensor 20 of apparatus 10. Based on a location of the sensed data, which may be generated through a global positioning system or other locationing means, a satellite image 220 of the environment of the vehicle may be identified. This satellite image may be more specifically identified based on a heading of the vehicle or a direction in which the perspective image was captured. This satellite image 220, together with the perspective image 210, are used as inputs to the regression network 225 from which a regressed bird's eye view image 230 is generated from the perspective image. This regressed image may be an input to the Generative Adversarial Network 240 to stabilize the regressed image in order to produce a stabilized bird's eye view image 250 from the perspective image.

Automatically generated bird's eye views of roads and their environments based on perspective imagery from an image sensor (e.g., sensor 20) of a vehicle (e.g., apparatus 10) may be used in a variety of ways. The bird's eye view may be provided to an occupant of a vehicle to provide an understanding of the location of the vehicle in an environment. As maps are generally viewed from a bird's eye perspective, viewing imagery data of the road and environment of a vehicle from the overhead perspective may provide an alternative and perhaps preferable view of the environment for a user, particularly when the user is attempting to understand a location or route within a road network. Further, while satellite imagery provides overhead views of an environment, satellite imagery is gathered and published only periodically, with updates sometimes years apart for a region. Embodiments described herein may provide imagery that replicates satellite imagery through a bird's eye view in a manner that can be updated regularly, particularly with crowd sourced data from vehicles traveling along a road network. Such data availability may enable overhead imagery to be updated routinely to the point where dynamic objects and objects that are temporary in an environment may be identified and shown in the overhead imagery. The bird's eye views generated through embodiments described herein may be used in conjunction with satellite imagery to augment satellite imagery to include features that may not have been captured and may not have been present when the satellite image of an area was captured. As such, embodiments provided herein have a wide variety of applications in which the data may be used to provide detail and information to users to facilitate navigation and/or autonomous or semi-autonomous vehicle control.

FIG. 4 illustrates a flowchart of an apparatus, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by a processor 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

According to the example embodiment of FIG. 4, first sensor data is received from a first vehicle traveling along a road segment in an environment at 310, where the sensor data includes a perspective image of the environment, a location of the vehicle, and a heading of the perspective image captured. A satellite image associated with the location and heading of the vehicle is retrieved at 320. A deep neural network is applied at 330 to the perspective image data to regress a bird's eye view image from the perspective image data. A generative Adversarial Network is applied at 340 to the regressed bird's eye view image using the satellite image as a target of the GAN to obtain a stabilized bird's eye view image. At 350, values are derived for a homography matrix between the sensor data and the stabilized bird's eye view image. The derived values of the homography matrix are stored at 360 in, for example, memory 14 or in database 110 of the map data service provider 108.

In an example embodiment, an apparatus for performing the method of FIG. 3 above may comprise a processor (e.g., the processor 12) configured to perform some or each of the operations (310-360) described above. The processor may, for example, be configured to perform the operations (310-360) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-360 may comprise, for example, the processor 12 and/or a device or circuit for executing instructions or executing an algorithm for processing information as described above.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:

receive first sensor data from a first sensor in an environment, wherein the first sensor data comprises perspective image data of the environment, wherein the first sensor data comprises a location and a heading;

retrieve a satellite image of the environment associated with the location and heading, wherein the satellite image is captured from a position above a ground plane;

generate a bird's eye view image of the environment above the ground plane from the first sensor data by warping the first sensor data from the perspective image data of the environment based on processing of the first sensor data relative to the satellite image; and apply a Generative Adversarial Network (GAN) to the bird's eye view image using the satellite image as a target of the GAN to obtain a stabilized bird's eye view image.

2. The apparatus of claim 1, wherein processing of the first sensor data relative to the satellite image comprises causing the apparatus to input the first sensor data and the satellite image into a deep neural network to regress the bird's eye view image.

3. The apparatus of claim 1, wherein the apparatus is further caused to provide for display of the stabilized bird's eye view image.

4. The apparatus of claim 1, wherein the apparatus is further caused to:
- derive values of a homography matrix between the first sensor data and the stabilized bird's eye view image; and
- store the derived values of the homography matrix.

5. The apparatus of claim 4, wherein the apparatus is further caused to:
- receive second sensor data from a second sensor in a second environment, wherein the second sensor data comprises perspective image data of the second environment from a perspective of the second sensor;
- apply a homography matrix including the stored, derived values to the second sensor data to warp the perspective image data of the second environment into a second ground plane;
- generate a second bird's eye view of the second environment from the perspective image data of the second environment; and
- provide for presentation of the second bird's eye view of the second environment on a display.

6. The apparatus of claim 5, wherein the apparatus is further caused to augment satellite image data of the second environment with the second bird's eye view of the second environment.

7. The apparatus of claim 1, wherein the bird's eye view image of the environment includes dynamic objects not found in a satellite image of the environment.

8. The apparatus of claim 1, wherein causing the apparatus to retrieve a satellite image of the environment associated with the location and heading comprises causing the apparatus to identify the location in a satellite image map database and to identify a portion of the satellite image corresponding to the heading.

9. A computer program product comprising at least one non-transitory computer-readable storage medium having computer-executable program code portions stored therein, the computer-executable program code portions comprising program code instructions configured to:
- receive first sensor data from a first sensor in an environment, wherein the first sensor data comprises perspective image data of the environment, wherein the first sensor data comprises a location and a heading;
- retrieve a satellite image of the environment associated with the location and heading, wherein the satellite image is captured from a position above a ground plane;
- generate a bird's eye view image of the environment above the ground plane from the first sensor data by warping the first sensor data from the perspective image data of the environment based on processing of the first sensor data relative to the satellite image; and
- apply a Generative Adversarial Network (GAN) to the bird's eye view image using the satellite image as a target of the GAN to obtain a stabilized bird's eye view image.

10. The computer program product of claim 9, wherein processing of the first sensor data relative to the satellite image comprise program code instructions to input the first sensor data and the satellite image into a deep neural network to regress the bird's eye view image.

11. The computer program product of claim 9, further comprising program code instructions to provide for display of the stabilized bird's eye view image.

12. The computer program product of claim 9, further comprising program code instructions to:
- derive values of a homography matrix between the first sensor data and the stabilized bird's eye view image; and
- store the derived values of the homography matrix.

13. The computer program product of claim 12, further comprising program code instructions to:
- receive second sensor data from a second sensor in a second environment, wherein the second sensor data comprises perspective image data of the second environment from a perspective of the second sensor;
- apply a homography matrix including the stored, derived values to the second sensor data to warp the perspective image data of the second environment into a second ground plane;
- generate a second bird's eye view of the second environment from the perspective image data of the second environment; and
- provide for presentation of the second bird's eye view of the second environment on a display.

14. The computer program product of claim 13, further comprising program code instructions to augment satellite image data of the second environment with the second bird's eye view of the second environment.

15. The computer program product of claim 9, wherein the bird's eye view image of the environment includes dynamic objects not found in a satellite image of the environment.

16. The computer program product of claim 9, wherein the program code instructions to retrieve a satellite image of the environment associated with the location and heading comprise program code instructions to identify the location in a satellite image map database and to identify a portion of the satellite image corresponding to the heading.

17. A method comprising:
- receiving first sensor data from a first sensor in an environment, wherein the first sensor data comprises perspective image data of the environment, wherein the first sensor data comprises a location and a heading;
- retrieving a satellite image of the environment associated with the location and heading, wherein the satellite image is captured from a position above a ground plane;
- generating a bird's eye view image of the environment above the ground plane from the first sensor data by warping the first sensor data from the perspective image data of the environment based on processing of the first sensor data relative to the satellite image; and
- applying a Generative Adversarial Network (GAN) to the bird's eye view image using the satellite image as a target of the GAN to obtain a stabilized bird's eye view image.

18. The method of claim 17, wherein processing of the first sensor data relative to the satellite image comprises inputting the first sensor data and the satellite image into a deep neural network to regress the bird's eye view image.

19. The method of claim 17, further comprising providing for display of the stabilized bird's eye view.

20. The method of claim 17, further comprising:
- deriving values of a homography matrix between the first sensor data and the stabilized bird's eye view image; and
- storing the derived values of the homographs matrix.

* * * * *